No. 766,505. PATENTED AUG. 2, 1904.
S. E. KNAPP & E. C. ORTEGA.
CHILLI ROASTER.
APPLICATION FILED SEPT. 29, 1900.
NO MODEL. 2 SHEETS—SHEET 1.
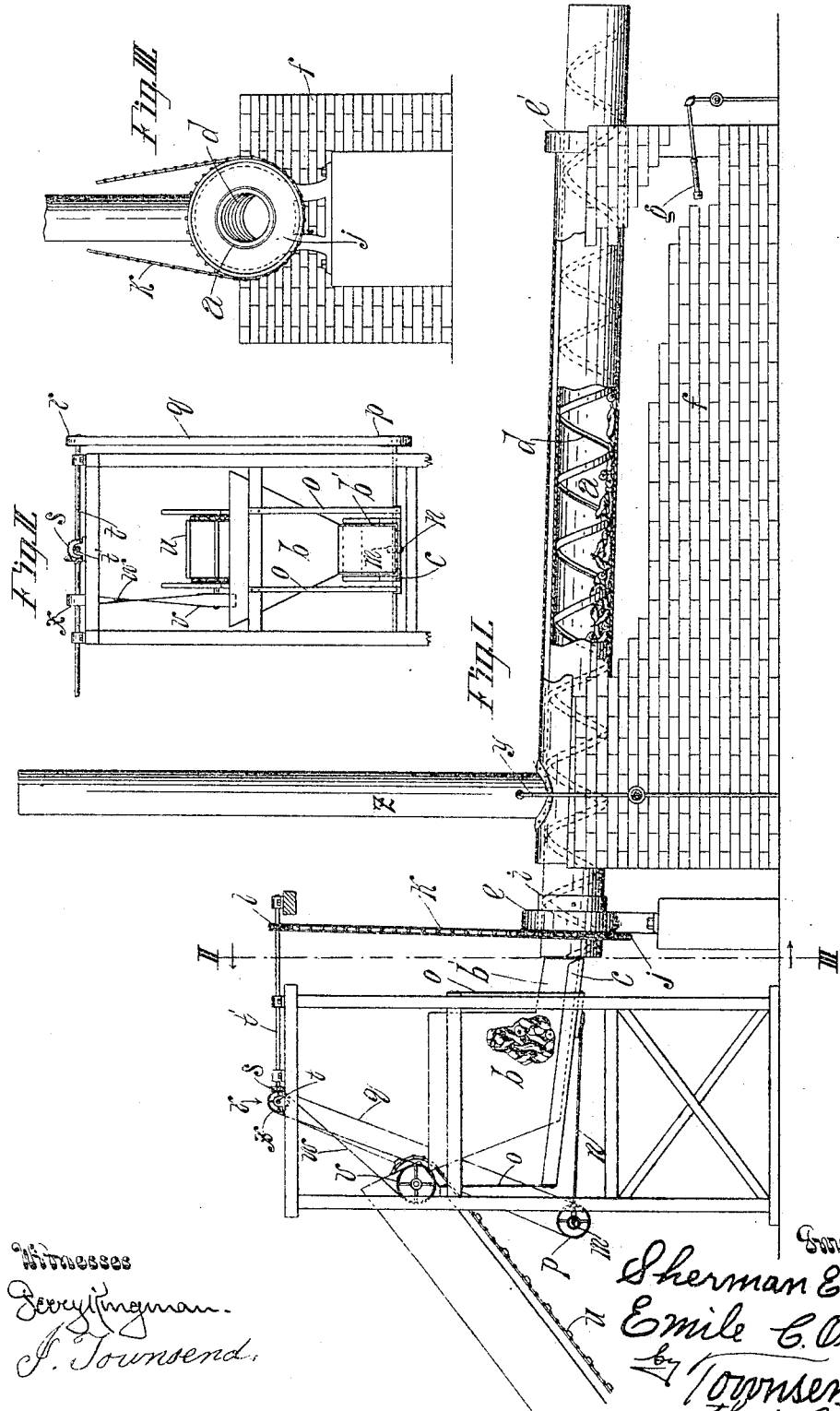

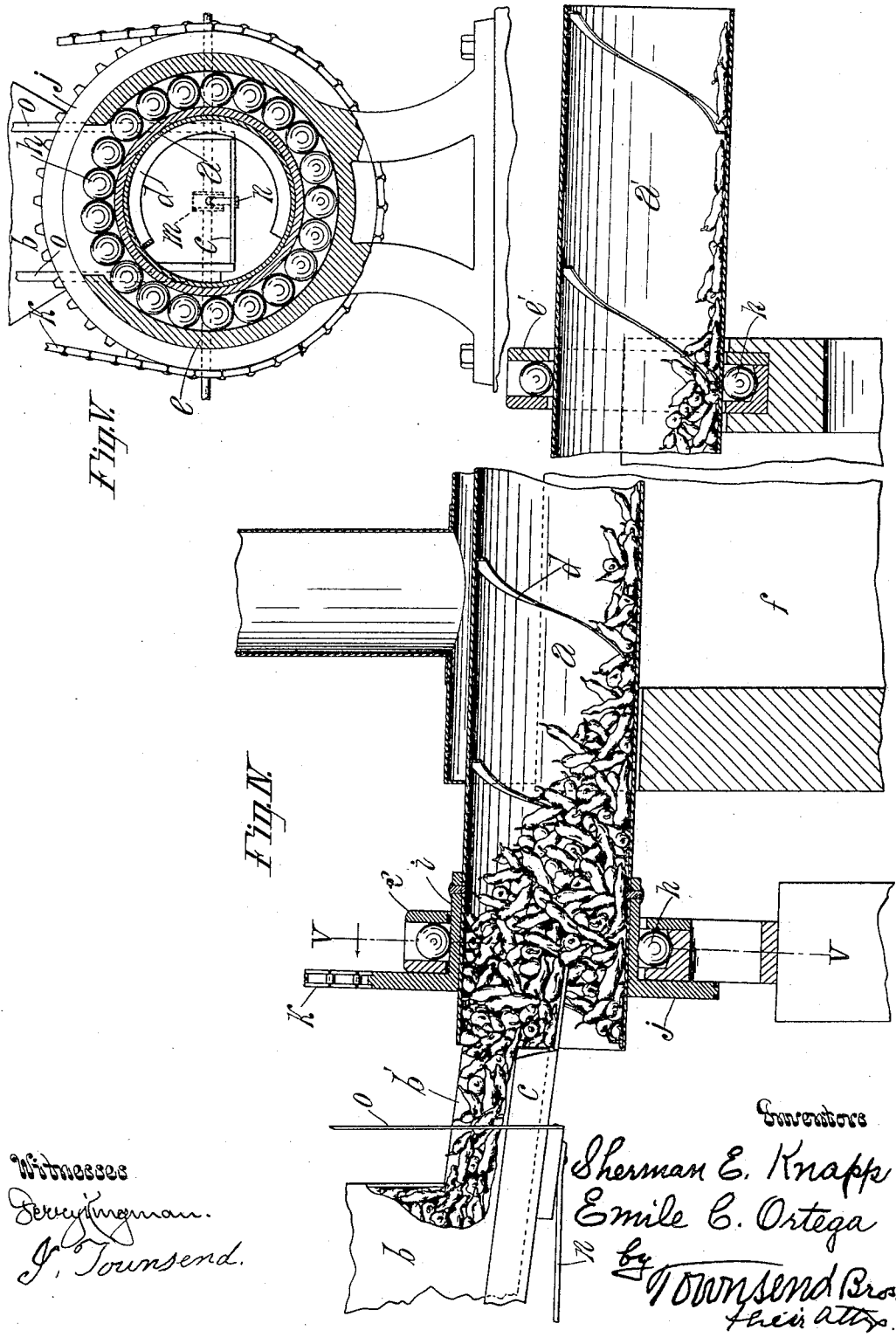

No. 766,505.    Patented August 2, 1904.

UNITED STATES PATENT OFFICE.

SHERMAN E. KNAPP AND EMILE C. ORTEGA, OF LOS ANGELES, CALIFORNIA.

CHILLI-ROASTER.

SPECIFICATION forming part of Letters Patent No. 766,505, dated August 2, 1904.

Application filed September 29, 1900. Serial No. 31,568. (No model.)

*To all whom it may concern:*

Be it known that we, SHERMAN ELLSWORTH KNAPP and EMILE CYRUS ORTEGA, citizens of the United States, residing at Los Angeles, in the county of Los Angeles and State of California, have invented a new and useful Chilli-Roaster, of which the following is a specification.

The object of our invention is to provide means whereby chillies can be prepared for canning in large quantities without impairing the flavor of the fruit.

It is necessary in the preparation of chillies for food that the skin shall be removed, and this can be done by heating the chillies sufficiently to generate steam between the pulp and the skin, thus to separate the pulp from the skin. It is necessary in order to preserve the flavor of the fruit that this separation shall be done by a roasting process and not by scalding, and an object of our invention is to produce means by which the chillies will be properly roasted.

We have discovered that in order to obtain the best effects the chillies should be heated gradually and finally subjected to a very high temperature for a short time, and in order to accomplish this we provide a heating-receptacle, means for heating the receptacle, means for choke-feeding chillies into the upper end of the receptacle, and means for conveying the chillies through the receptacle and for turning the chillies in the receptacle on their way therethrough. The form of heating-receptacle which we prefer and which we have used in the machine in which we have reduced our invention to practice consists in an open-ended rotating tube, and the means for conveying and stirring the fruit in said receptacle consists in a spiral flange or worm fastened to the inside of the tube and extending from end to end thereof, and means are provided for feeding the fruit into the upper end of the tube faster than it will be carried away by the spiral flange.

The accompanying drawings illustrate our invention as embodied in the machine which we have in operation.

Figure I is a side elevation of our invention, parts being broken away to expose interior construction. Chillies are shown in the heating-receptacle. Fig. II is an elevation on line II III, Fig. I, looking to the left in the direction of the upper arrow. Fig. III is an elevation on line II III, Fig. I, looking to the right in the direction of the lower arrow. Fig. IV is a fragmental axial section on an enlarged scale. Fruit is shown being fed into and passing through the receptacle. Fig. V is a section on line V V, Fig. IV, looking left in the direction of the arrow.

$a$ indicates the receptacle, formed of an open-ended tube, preferably a cast-iron pipe of, say, twelve inches, more or less, in diameter.

$b$ indicates a hopper for supplying the chillies to the upper end of the receptacle.

$c$ indicates the choke-feeder, the same having a longitudinally-vibrating hopper-bottom extending into the tube for choke-feeding the chillies into the upper end of the receptacle.

By the term "choke-feeding" we mean feeding the fruit into the receptacle more rapidly than the fruit will pass through the receptacle, so as to keep the upper end of the receptacle practically filled with chillies while the machine is in operation, the capacity of the choke-feeder being greater than the capacity of the mechanism for conveying the chillies through the receptacle.

In order that the chillies may be conveyed through and turned within the drying-tube without being caught and bruised between any relatively moving parts, the means which are provided to accomplish this function are made stationary with relation to the inner wall of said tube.

$d$ indicates the spiral flange or worm for conveying the chillies through the receptacle from end to end. At the upper end of the tube the flange $d$ preferably has a pitch equal to the diameter of the pipe—that is to say, for a twelve-inch pipe the spiral will make one revolution in every twelve inches at the upper end and throughout the greater portion of the pipe which is within the furnace, while at the discharge end and outside of the furnace the space between the spirals will be in excess of this—say for a twelve-inch pipe the pitch of the lower end of the worm will be about eighteen inches. It is to be understood that these dimensions may be varied within practical limits, the purpose being to carry the fruit through the highly-heated portion of the pipe at such a speed as to allow the fruit to become heated to such a high temperature that the skin will be blistered away from the pulp.

The purpose of the choke-feeding at the upper end is to subject the green chillies to the action of the steam which rises from the roasting chillies and passes upward through the green chillies when they are first introduced into the pipe. The effect of this steam is to subject the cold chillies to a heated atmosphere surcharged with vapor emanating from the roasting chillies, and this does not in any way injure the flavor of the chillies. The purpose of the greater length of spiral at the discharging end is to check the chillies before discharge, thereby obstructing the lower end of the pipe and lessening the entrance of cold air thereat, the feed through the heated portion being more rapid than it is through the portion $a'$ of the pipe, which extends outside of the furnace at the discharge end.

During rotation of the tube an effect opposite to that just described would be produced by the spiral if it was acting upon weighty matter and was broad enough to carry such matter positively along with it; but, as shown in the drawings, the spiral is so narrow that the chillies readily fall over it. Therefore said spiral merely assists in driving the chillies forward by repeatedly striking obliquely against them. Within certain limits a narrow spiral moves the chillies forward more slowly when there are fewer coils in a given length of the tube. This appears to be due to two reasons: first, the spiral strikes the chillies more nearly at a right angle to the direction in which they are moving, so that they immediately roll over it instead of sliding along beside it; second, there are less coils in a given space, and therefore a less number of forward impulses is given to the chillies.

$e$ indicates a ball-bearing raceway at the upper end of the tube outside of the furnace, and $e'$ indicates a ball-bearing raceway at a lower level at the discharge end of the tube. This is preferably supported by the end wall of the furnace $f$.

$g$ indicates an oil-burner for supplying the heat. It is to be understood that any suitable means for producing the heat in the furnace may be employed.

$h$ indicates the antifriction-balls in the ball-bearing raceways $e\ e'$.

$i$ indicates a collar rigidly fastened to the tube at the upper end thereof and furnished with a flange $j$, formed in a sprocket-wheel.

$k$ indicates a sprocket-chain around the sprocket-wheel and leading from a driving sprocket-wheel $l$.

$m$ indicates an eccentric cam for reciprocating a connecting-rod $n$, which is fastened to the vibrating trough $c$, which forms the bottom of the hopper $b$.

$o$ indicates suspending-rods, which are preferably resilient to form springs for sustaining the trough $c$. The trough $c$ slants at an angle steeper than the slant of the pipe $a$, thus to help produce the choke-feeding action relied upon.

$b'$ indicates trough extensions of the hopper $b$ to form upward extensions of the walls of the trough $c$ to conduct the chillies into the upper end of the tube $a$. The eccentric $m$ is operatively connected with the driving sprocket-wheel $l$ through the medium of the pulley $p$, belt $q$, pulley $r$, bevel-gears $s$, and shafts $t\ t'$, so that the vibration of the trough $c$ will be proportionate with the rotation of the tube $a$.

$u$ indicates an elevator driven by a pulley $v$, which is driven by a belt $w$, driven by a pulley $x$ on the power-shaft $t$. The speed of vibration of the vibratory hopper-bottom is made greater than the speed of rotation of the roasting-tube, so that it will operate as a choke-feeder for the roaster.

$y$ indicates a steam-jet for the smoke-stack $z$ of the furnace.

In practical operation the chillies will be supplied to the elevator $u$ and will thereby be fed into the hopper $b$ onto the vibrating floor of said hopper, which slopes downward into the tube. The vibration of the sloping hopper-floor moves the chillies rapidly down to the tube and feeds them thereinto with such speed as to keep closed the inlet to the chamber of the tube. The flange in the rotating tube carries the chillies through the tube and discharges them at the lower end properly roasted and without being bruised or crushed.

It is to be understood that we do not limit ourselves to the sprocket form of driving-wheel $j$, but that any suitable means may be employed for rotating the tube and for feeding the chillies into the tube. The balls of the bearing encircle the tube and hold it in true position, and the heat of the furnace does not affect them to produce any excessive friction.

What we claim, and desire to secure by Letters Patent of the United States, is—

1. The combination of a furnace; an open-ended tube extending aslant through the furnace; a spiral worm inside the tube; means for rotating the tube; a hopper; a vibrating bottom for said hopper extending to the tube; and means for vibrating the hopper-bottom toward and from the chamber of the tube.

2. The combination of a furnace; an open-ended tube extending aslant through the furnace and journaled to revolve; a spiral worm extending from end to end inside the tube and being of less pitch outside the furnace at the discharge end of the tube than inside the furnace; means for rotating the tube; and means for feeding chillies into the open end of the tube.

3. The combination of a furnace; a stationary ball-bearing raceway at one end of the furnace; a ball-bearing raceway at a lower level at the other end of the furnace; an open-ended tube extending aslant through said ball-bearing raceway; a ball-bearing collar fastened on the tube at the upper end thereof and extending within the upper ball-bearing raceway; a driving-wheel fastened to the tube at the upper end thereof; means for turning the driving-wheel; a hopper with vibrating bottom extending aslant into the upper end of the tube; and means for vibrating the hopper-bottom to discharge chillies into the upper end of the tube.

4. In a chilli-roaster, in combination, a furnace, an open-ended rotary tube journaled aslant in said furnace, means for feeding chillies into the upper end of the tube, means for rotating the tube, and means moving with said tube for turning chillies therein and accelerating their forward movement therethrough, said means giving less acceleration to the chillies near the lower end of the tube.

5. A chilli-roaster comprising a furnace; an open-ended rotary tube journaled aslant in said furnace; a shaking-spout for feeding chillies into the upper end of the tube; means for rotating the tube; means operatively connecting the tube-rotating means and the spout with each other; and means whereby the chillies are moved forward slower near the lower end of the tube than throughout the central portion thereof.

In testimony whereof we have signed our names to this specification, in the presence of two subscribing witnesses, at Los Angeles, California, this 22d day of September, 1900.

S. E. KNAPP.
E. C. ORTEGA.

Witnesses:
JAMES R. TOWNSEND,
J. ROYAL LEMON.